United States Patent [19]

Kubota et al.

[11] Patent Number: 4,969,752
[45] Date of Patent: Nov. 13, 1990

[54] THRUST BEARING MADE OF SYNTHETIC RESIN

[75] Inventors: Shuichi Kubota, Yokohama; Hiroto Kamimura, Fujisawa; Hiroshi Suda, Zushi, all of Japan

[73] Assignee: Oiles Industry Co., Ltd., Tokyo, Japan

[21] Appl. No.: 361,991

[22] Filed: Jun. 6, 1989

Related U.S. Application Data

[63] Continuation-in-part of Ser. No. 89,127, Aug. 25, 1987, abandoned.

[30] Foreign Application Priority Data

| Sep. 1, 1986 | [JP] | Japan | 61-133931 |
| Sep. 1, 1986 | [JP] | Japan | 61-133932 |
| Dec. 23, 1986 | [JP] | Japan | 61-196803 |
| Dec. 23, 1986 | [JP] | Japan | 61-196804 |
| Jan. 19, 1987 | [JP] | Japan | 62-5957 |
| Jan. 19, 1987 | [JP] | Japan | 62-5956 |
| Jan. 27, 1987 | [JP] | Japan | 62-10127 |
| Feb. 14, 1989 | [JP] | Japan | 64-16171[U] |

[51] Int. Cl.$^5$ .................. F16C 17/04; F16C 33/74
[52] U.S. Cl. .................. 384/420; 384/124; 384/130; 384/607
[58] Field of Search .......... 384/121, 123–125, 384/226–228, 303, 420–427, 590, 607, 130–153

[56] References Cited

U.S. PATENT DOCUMENTS

| 3,120,982 | 2/1964 | LeBlanc | 384/420 |
| 3,725,973 | 4/1973 | Gwozdz | 384/420 X |
| 4,239,301 | 12/1980 | Pannwitz | 384/125 |
| 4,319,768 | 3/1982 | Youngdale | 384/125 X |

FOREIGN PATENT DOCUMENTS 50-23542 6/1973 Japan.

Primary Examiner—Thomas R. Hannon
Attorney, Agent, or Firm—Mason, Fenwick & Lawrence

[57] ABSTRACT

A thrust bearing for use with an automobile thrust-strut type suspension comprises a lower casing made of resin, an upper casing made of resin, and a bearing piece made of resin. The bearing piece is disposed rotatably within the upper and lower casings upon snap-fitting a hook portion of an annular suspended portion of the upper casing with an engaging portion of an annular protruded portion of the lower casing. The thrust bearing is so adapted that two annular inner labyrinth portions and two annular outer labyrinth portions are respectively formed at inner and outer peripheral portions of the thrust bearing to thereby prevent sufficiently dust from intruding into a sliding surface of the bearing piece.

4 Claims, 21 Drawing Sheets

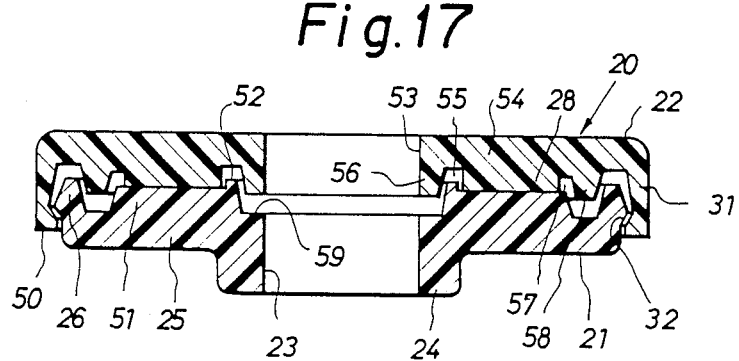
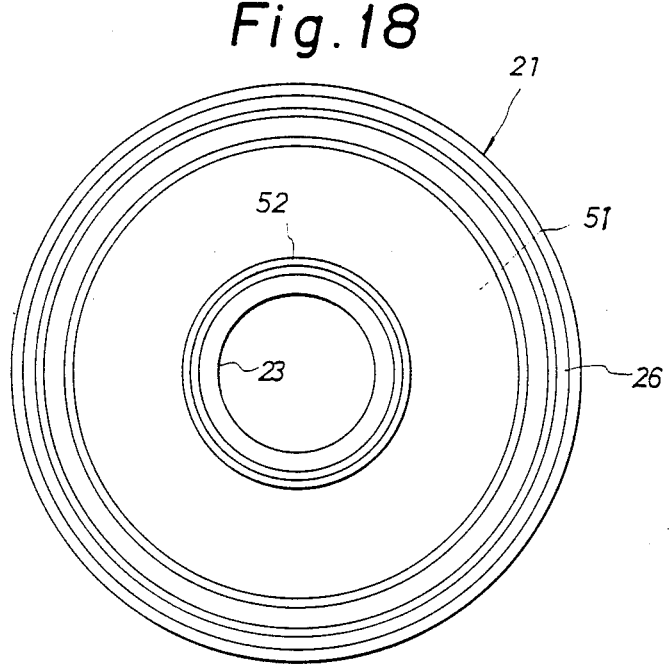

THRUST BEARING MADE OF SYNTHETIC RESIN

CROSS-REFERENCE TO RELATED APPLICATION

The present application is a continuation-in-part of U.S. Pat. application Ser. No. 089127 filed Aug. 25, 1987 now pending (allowed on Feb. 21, 1989).

BACKGROUND OF THE INVENTION

The present invention concerns a thrust bearing made of synthetic resin, particularly, it relates to a thrust bearing made of synthetic resin assembled into a strut-thrust type suspension (MacPherson type) for use in four wheel cars.

Generally, a strut-thrust type suspension is mainly used for the front wheels of four wheel cars in which coil springs are combined with a strut assembly incorporating an oil pressure type shock absorber in an outer cylinder integrated with a main shaft. The suspension described above includes such a type in which a piston rod of a strut assembly is rotated when the assembly is rotated together with coil springs by a steering operation and another type in which the piston rod is not rotated. In both of the types, a thrust bearing is required between the mounting member of the assembly to a vehicle body and the upper spring seat of the coil assembly for allowing the smooth rotation of the strut assembly.

Roller bearings using balls or needles, or sliding type thrust bearings made of synthetic resin have been employed so far in these portions.

A dust seal made of an elastic rubber member is mounted at the outer circumference of the sliding surface for the thrust bearing made of synthetic resin for preventing the intrusion of dust or the like from the outside of the bearing to the sliding surface.

In the prior art described above, since a dust seal is disposed to the outer circumference of the sliding surface for the thrust bearing, there is a drawback that the sliding frictional force is increased upon steering operation thereby requiring great steering force.

SUMMARY OF THE INVENTION

The present invention is achieved in order to overcome the foregoing drawback in the prior art and it is an object of the invention to obtain a thrust bearing made of synthetic resin capable of preventing the intrusion of dust or the like without using dust seals made of elastic rubber members and thereby preventing increase of the steering power upon steering operation.

The foregoing object can be attained by the following constitutions in accordance with the present invention, that is:

a first thrust bearing for use with an automobile thrust-strut type suspension having a strut incorporating a shock absorber, a piston rod inserted in the shock absorber, a mounting member for supporting the piston rod to the automobile body, and an upper spring seat loosely engaging the piston rod, the mounting member and the upper spring seat having opposed, substantially planar surface offset from each other and defining an annular space between them, said bearing being adapted to be received in the annular space between the upper spring seat and the mounting member and adapted to receive the piston rod therethrough, said bearing comprising:

a lower casing made of synthetic resin and having a longitudinal axis, said lower casing including:

a cylindrical portion having a substantially planar upper surface, a lower surface, an outer circumferential surface, and a penetration aperture of circular cross-section coaxial with said longitudinal axis of said lower casing, said penetration aperture being adapted to receive the piston rod of the suspension therein; and a collar portion extending outwardly from and formed integrally with said outer circumferential surface of said cylindrical portion, said collar portion having substantially planar upper and lower surfaces and an outer circumferential surface, said lower surface of said collar portion being adapted to matingly engage the upper surface of the upper spring seat of the suspension, and said collar portion including an annular inner lower lip portion extending upwardly from said upper surface of said collar portion coaxially with said longitudinal axis of said lower casing and formed integrally with said upper surface of said collar portion, said inner lower lip portion having a distal end offset from said upper surface of said collar portion, said collar portion further including an annular protruded portion extending upwardly from said upper surface of said collar portion and formed integrally with said outer circumferential surface of said collar portion, said protruded portion having an outer circumferential surface and an outwardly extending engaging portion formed on said outer circumferential surface of said protruded portion, and said collar portion further including an annular outer lower lip portion extending upwardly from said upper surface of said collar portion coaxial with said longitudinal axis of said lower casing and defining an inner annular groove in cooperation with said inner lower lip portion and an outer annular groove with said protruded portion, said outer lower lip portion having a distal end offset from said upper surface of said collar portion, and said inner annular groove having a bottom surface, said inner lower lip portion having an outer diameter "d1" and said outer lower lip portion having an inner diameter "d2", respectively, "d1" being smaller than "d2";

an upper casing made of synthetic resin and having a longitudinal axis, said upper casing comprising a disk-like portion having substantially planar upper and lower surfaces, an outer circumferential edge, a circular aperture formed at the center thereof coaxial with said longitudinal axis of said upper casing and defining an inner circumferential edge, an annular outer upper lip portion extending downwardly from said lower surface of said disk-like portion coaxial with said longitudinal axis of said upper casing, and an annular suspended portion extending downwardly from said lower surface of said disk-like portion and formed integrally with said outer circumferential edge of said disk-like portion and defining an outer annular groove in cooperation with said outer upper lip portion, said upper casing further including an annular inner upper lip portion extending downwardly from said lower surface of said disk like portion coaxial with said longitudinal axis of said upper casing and formed integrally with an inner circumferential portion of said disk-like portion and defining an inner annular groove in cooperation with said annular outer upper lip portion, said upper surface of said disk-like portion being adapted to matingly engage the lower surface of the mounting member of the suspension, said circular aperture being adapted to receive the piston rod of the suspension therein, said inner and outer upper annular lip portions each having a distal end offset from said lower surface of said disk-like portion, and said suspended portion having a distal end offset from said lower surface of said disk-like portion and an engaging hook portion formed at said distal end for cooperation with said engaging portion of said protruded portion; and a bearing piece made of synthetic resin and comprising an annular plate having upper and lower surfaces and an inner diameter greater than "d1" and an outer diameter less than "d2", said bearing piece being received in said inner annular groove of said lower casing;

said hook portion of said suspended portion of said upper casing being snap-fitted with said engaging portion of said protruded portion of said lower casing to define a snap-fit portion, whereby said upper casing is fitted rotatably to said lower casing, said upper surface of said bearing piece being slidably abutted against said lower surface of said disk-like portion, said distal ends of said inner and outer upper lip portions being overlapped radially with said distal ends of said inner and outer lower lip portions, respectively, to define inner and outer overlapped portions, said lower surface of said bearing piece being slidably abutted against said bottom surface of said inner annular groove, whereby tight seals are formed at said snap-fit portion and said inner and outer overlapped portions, and a second thrust bearing comprises an abovementioned first thrust bearing, in which said cylindrical portion further has an annular innermost lower lip portion extending upwardly from said upper surface of said cylindrical portion adjacent and offset stepwise from said penetration aperture, said innermost lower lip portion defining a cylindrical aperture having a diameter slightly greater than that of said penetration aperture and defining an innermost annular groove in cooperation with said inner lower lip portion, said innermost lower lip portion having a distal end offset from said upper surface of said cylindrical portion, said distal end of said innermost lower lip portion being overlapped radially with said distal end of said inner upper lip portion, said disk-like portion further has an innermost upper lip portion extending downwardly from said lower surface of said disk-like portion and formed integrally with said inner circumferential edge of said disk-like portion, and defining an innermost annular groove in cooperation with said inner upper lip portion, said innermost upper lip portion having a distal end offset from said lower surface of said disk-like portion, said distal end of said innermost upper lip portion being overlapped radially with said distal end of said, inner lower lip portion.

According to the first thrust bearing of the present invention, advantageous effects as described below can be obtained. Since triple tight seals are formed by the labyrinth effect in the snap-fit portion between the suspended portion of the upper casing and the protruded portion of the lower casing and in the overlapped portion between the inner upper and lower lip portions and between the outer upper and lower lip portions respectively, intrusion of dust or the like from the inner and outer circumferential surfaces of the bearing to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Further, since the upper casing and lower casing can be engaged by snap-fitting, the assembly work can be conducted extremely easily.

According to the second thrust bearing of the present invention, advantageous effects as described below can be obtained. Since four-fold tight seals are formed by the labyrinth effect the snap-fit portion between the suspended portion ,of the upper casing and the protruded portion of the lower casing, in the overlapped portion between the annular outer upper lip portion and the annular outer lower lip portion, in the overlapped portion between the annular inner upper lip portion and the annular inner lower lip portion, and in the overlapped portion between the annular innermost upper lip portion and the annular innermost lower lip portion, intrusion of dust or the like from the inner and outer circumferential surfaces of the bearing to the sliding face of the bearing can be prevented. In addition, since dust seals made of elastic rubber member used so far can be deleted, undesirable increase in the steering force upon steering operation due to the dust seals can be avoided and smooth steering operation is possible for a long period of time.

Further, since the upper casing and the lower casing can be engaged by snap-fitting, the assembly work can be conducted extremely easily.

In the constitution of the thrust bearing according to the present invention as described above, it is necessary that the synthetic resin constituting the casing, the upper casing and the lower casing is excellent in mechanical properties such as abrasion resistance, impact shock resistance and creep resistance. Further, it is particularly preferred that the bearing body slidably fitted to the, casing or the bearing piece disposed within the upper and lower casings has a self-lubricity, and there can be used preferably, for example, polyacetal resin, polyamide resin, polyester resin, such as polybutylene terephthalate (PBT) and polyolefine resin such as polyethylene and polypropylene, as well as polycarbonate resin. Similar synthetic resin to that for the bearing body or the bearing piece can be used for the casing, the upper casing and the lower casing and it is desirable to use a synthetic resin material that exhibits preferable friction characteristics when combined with the synthetic resin used for the bearing body or the bearing piece and shows a relatively high rigidity.

Examples of desirable combination of resins are as shown in the table below.

TABLE

| Bearing body or bearing piece | Casing, upper casing or lower casing | Friction coefficient | Abrasion amount (mm) |
| --- | --- | --- | --- |
| Polyacetal | Polyamide | 0.05 | 0.020 |
| Polyamide | Polyacetal | 0.04 | 0.021 |
| Polyethylene | Polyacetal | 0.04 | 0.038 |
| Polycarbonate | Polyacetal | 0.06 | 0.050 |
| Polyacetal | PBT | 0.07 | 0.045 |
| Polyacetal | Polyacetal | 0.06 | 0.025 |
| Polyacetal | Steel | 0.11 | 0.095 |

In the table, the frictional characteristics show the result obtained under the following test conditions.

Test Condition

Thrust load : 350 kg, angle of swing : ±35°, velocity of swing : 60 cpm, lubrication : silicon grease was coated on the sliding face upon starting.

The abrasion amount indicates the amount of dimensional change (mm) in the bearing body or the bearing piece after conducting 1,000,000 cycles of the test.

If the combination of the synthetic resins for the casing and the bearing body, or the combination of the synthetic resin for the upper and lower casings and the bearing piece is preferably selected as described above, since the sliding face of the bearing is constituted with the combination of synthetic resins excellent in the self lubricity, the friction coefficient is low and stable steering power can be maintained for a long period of time.

This invention will be explained more specifically while referring to the accompanying drawings, by which the foregoing objects as well as the constitutions of the present invention will become more apparent.

Specific embodiments to be explained hereinafter are given for easy understanding of the present invention and various modifications may be possible by those skilled in the art without departing the scope of the present invention as clearly shown in the scope of the claim for patent.

BRIEF DESCRIPTION OF THE DRAWINGS

FIG. 17 is a longitudinal cross sectional view of one embodiment of the fourth thrust bearing according to the present invention;

FIG. 18 is a plan view for the casing shown in FIG. 17;

DESCRIPTION OF THE PREFERRED EMBODIMENTS

Figure 1:
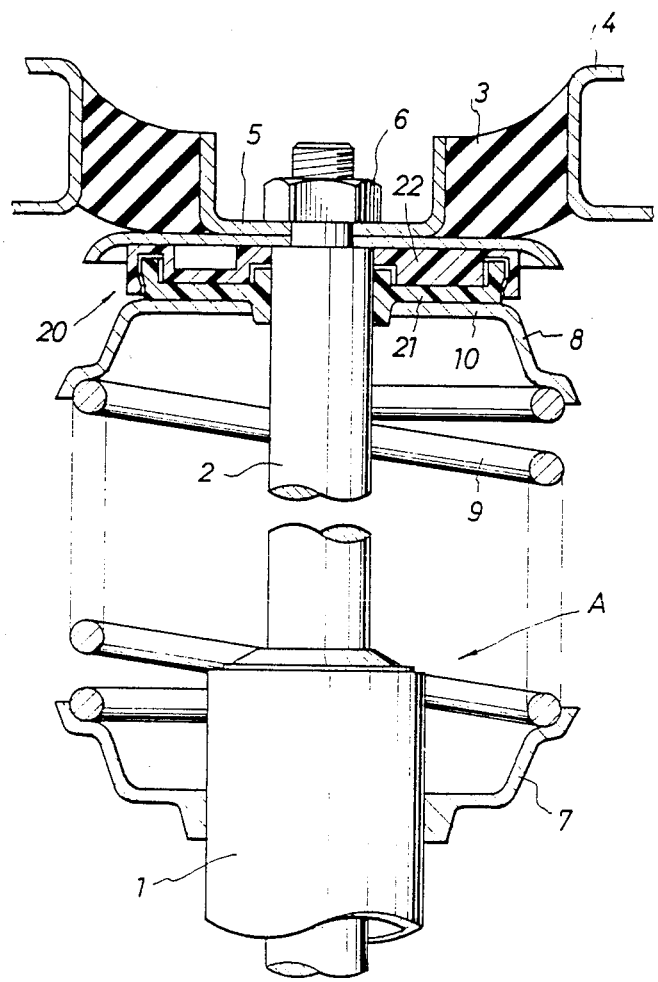
FIG. 1 is a longitudinal cross sectional view of a strut assembly equipped with a first thrust bearing according to the present invention.

In FIG. 1, a thrust assembly A comprises a strut 1 incorporating a shock absorber and a piston rod 2 inserted at one end into the shock absorber of the strut 1 and protruded at the other end from the shock absorber. The other end of the rod 2 is secured by means of a nut 6 to a mounting member 5 supported to a vehicle body 4 by way of a mount insulator 3 made of elastic rubber material.

A lower spring seat 7 is secured to the outer circumferential surface of the strut 1, while an upper spring seat 8 is disposed opposing to the seat 7 and loosely engaged to the outer circumferential surface of the rod 2. A coil spring 9 is disposed between the upper and the lower seats 7 and 8.

A first thrust bearing 20 made of synthetic resin of the present invention is disposed between the flat portion 10 of the seat 8 and the mounting members 5, and the thrust bearing 20 comprises a casing 21 made of synthetic resin and a bearing body 22 made of synthetic resin slidably fitted to the casing 21.

Figure 2:
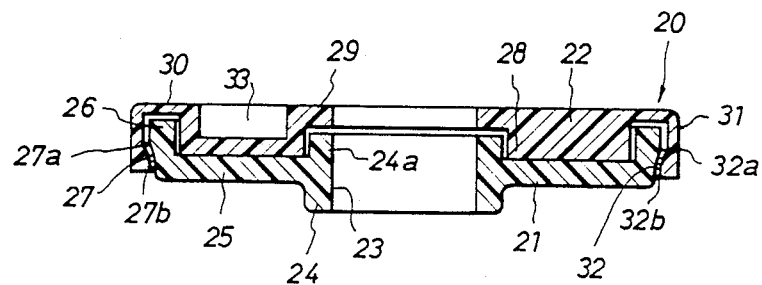
FIG. 2 is a longitudinal cross sectional view of one embodiment of the first thrust bearing according to the present invention.
Figure 3:
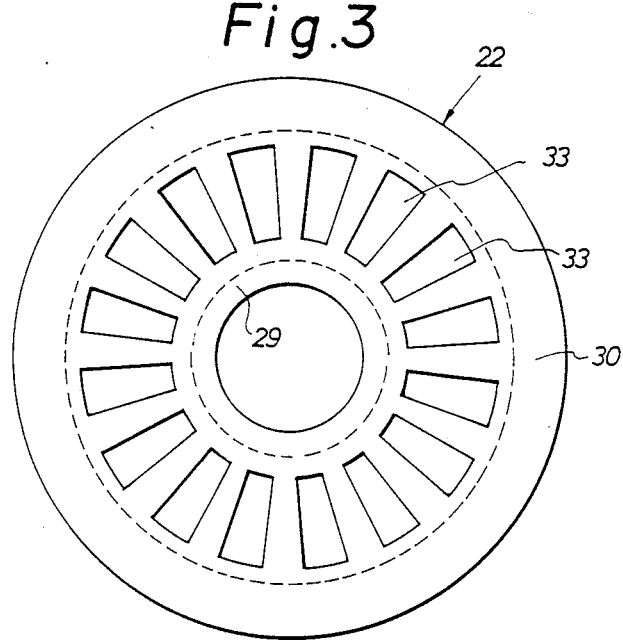
FIG. 3 is a plan view for the bearing body shown in FIG. 2.
Figure 4:
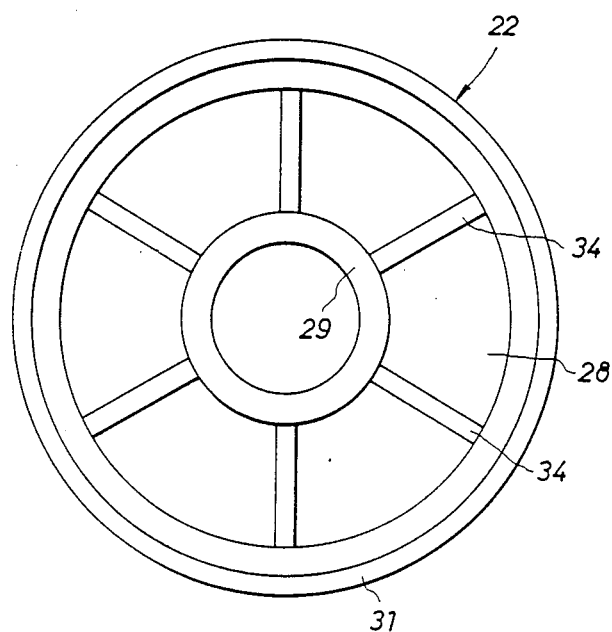
FIG. 4 is a bottom view for the bearing body shown in FIG. 2.
Figure 5:
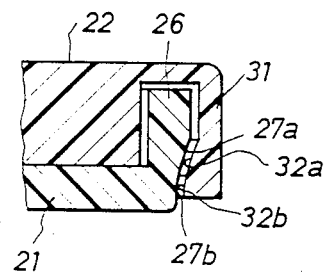
FIG. 5 is an enlarged cross sectional view for a part in a snap-fit portion shown in FIG. 2.
Figure 6:
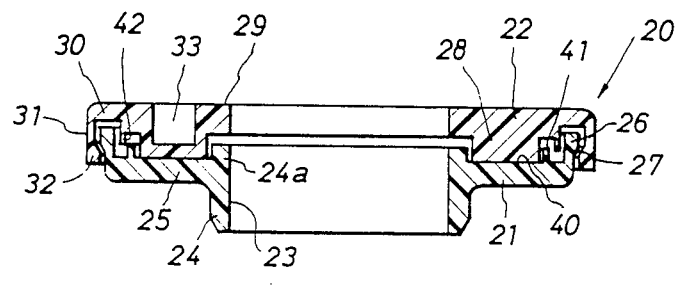
FIG. 6 is a longitudinal cross sectional view of one embodiment of the second thrust bearing according to the present invention.
Figure 7:
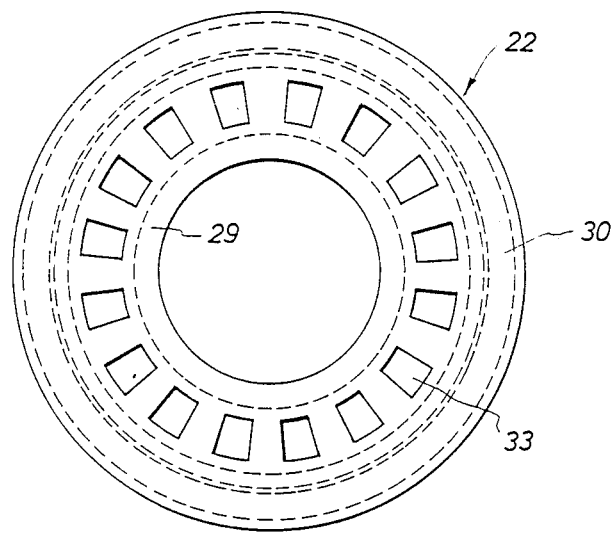
FIG. 7 is a plan view for the bearing body shown in FIG. 6.
Figure 8:
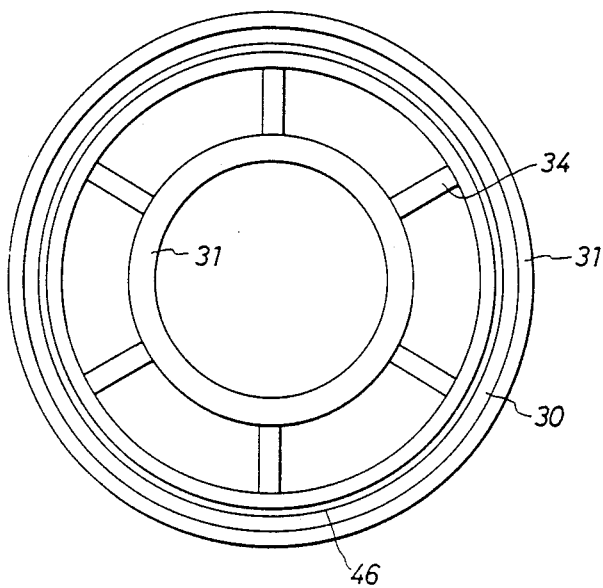
FIG. 8 is a bottom view for the bearing body shown in FIG. 6.
Figure 9:
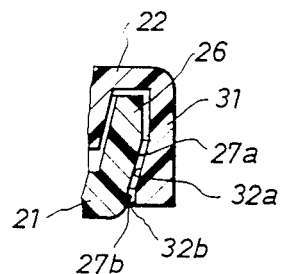
FIG. 9 is an enlarged cross sectional view for a part in a snap-fit portion shown in FIG. 6.

Explanation will be made specifically for one embodiment of a first thrust bearing according to the present invention referring to FIGS. 2 through 4 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface of the cylindrical portion 24 in a state where one end 24a of the cylindrical portion 24 is protruded therefrom, an annular protruded portion 26 formed integrally with an outer circumferential edge of the collar portion 25 and an engaging portion 27 formed to an outer circumferential surface of the protruded portion 26. The collar portion 25 may be formed at a lower end of the cylindrical portion 24.

The engaging portion 27 consists of a tapered surface portion 27a formed from the outer circumferential surface of the protruded portion 26 to an lower surface of the collar portion 25 and a cylindrical surface portion 27b continuous with the tapered surface portion 27a and reaching the lower surface of the collar 25.

The bearing body 22 made of synthetic resin includes a cylindrical bearing portion 28, an annular inner collar portion 29 formed integrally with an upper end of an inner circumferential surface of the cylindrical bearing portion 28, an annular outer collar portion 30 formed integrally with an upper end of the outer circumferential surface of the bearing portion 28, an annular suspended portion 31 formed integrally with an circumferential edge of the collar portion 30 and an engaging hook portion 32 formed at a lower end of the suspended portion 31. The hook portion 32 consists of a tapered surface portion 32a corresponding to the tapered surface portion 27a that constitutes the engaging portion 27 of the casing 21 and a cylindrical surface portion 32b continuous with the tapered surface portion 32a and corresponding to the cylindrical surface portion 27b of the engaging portion 27.

The bearing body 22 is fitted rotatably to the casing 21 by snap-fitting the hook portion 32 of the suspended portion 31 with the engaging portion 27 of the casing 21, whereby a tight seal is formed by the labyrinth effect in the snap-fit portion.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing body 22 is fitted to the casing 21 such that the lower surface of the bearing portion 28 is slidably abutted against the upper surface of the collar portion 25 of the casing 21.

Explanation will be made specifically for one embodiment, of the second thrust bearing according to the present invention referring to FIGS. 6 through 9 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface at the end of the cylindrical portion 24 in a state where one end 24a of the cylindrical portion 24 is protruded therefrom, an annular protruded portion 26 formed integrally with an outer circumferential edge of the collar portion 25, an engaging portion 27 formed to an outer circumferential surface of the protruded portion 26 and an annular lower lip portion 41 formed coaxially with the penetration aperture 23 at an upper surface of the collar portion 25 and defining an annular groove 40 in cooperation with one end 24a of the cylindrical portion 24.

The engaging portion 27 consists of a tapered surface portion 27a formed from the outer circumferential surface of the protruded portion 26 to a lower surface of the collar portion 25 and a cylindrical surface portion 27b continuous with the tapered surface portion 27a and reaching the lower surface of the collar portion 25.

The bearing body 22 includes a cylindrical bearing portion 28, an annular inner collar portion 29 formed integrally with an upper end of an inner circumferential surface of the bearing portion 28, an annular outer collar portion 30 formed integrally with the upper end of the outer circumferential surface of the bearing portion 28, an annular suspended portion 31 formed integrally with the outer circumferential edge of the collar portion 30, an engaging hook portion 32 formed at a lower end of the suspended portion 31 and an annular upper lip portion 42 formed coaxially with the bearing portion 28 at a lower surface of the collar portion 30 and having an inner diameter larger than an outer diameter of the annular lower lip portion 41 formed to an upper surface of the collar portion 25 of the casing 21.

The hook portion 32 consists of a tapered surface portion 32a corresponding to the tapered surface portion 27a that constitutes the engaging portion 27 of the casing 21 and a cylindrical surface portion 32b continuous with the tapered surface portion 32a and corresponding to the cylindrical surface portion 27b of the engaging portion 27.

The bearing body 22 is fitted rotatably to the casing 21 by snap-fitting the hook portion 2 of the suspended portion 31 with the engaging portion 27 of the casing 21 and by radially overlapping an end of the upper lip portion 42 with the lower lip portion 41 of the casing 21, whereby tight seals are formed by the labyrinth effect in the snap-fit portion and in the upper and lower lip portions.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing portion 28 of the bearing body 22 is disposed within the groove 40 such that the lower surface of the bearing portion 28 is slidably abutted against the bottom face of the groove 40 of the casing 21.

The sliding face defined with the lower surface of the bearing portion 28 of the bearing body 22 and the bottom face of the groove 40 formed to the casing 21 slidably abutting against the lower surface is protected against the intrusion of dust or the like from the inner circumferential surface of the thrust bearing 20 by the labyrinth effect due to the tight seal formed in the snap fit portion and in the overlapped portion between the upper and lower lip portions 42, 41 respectively.

Figure 10:
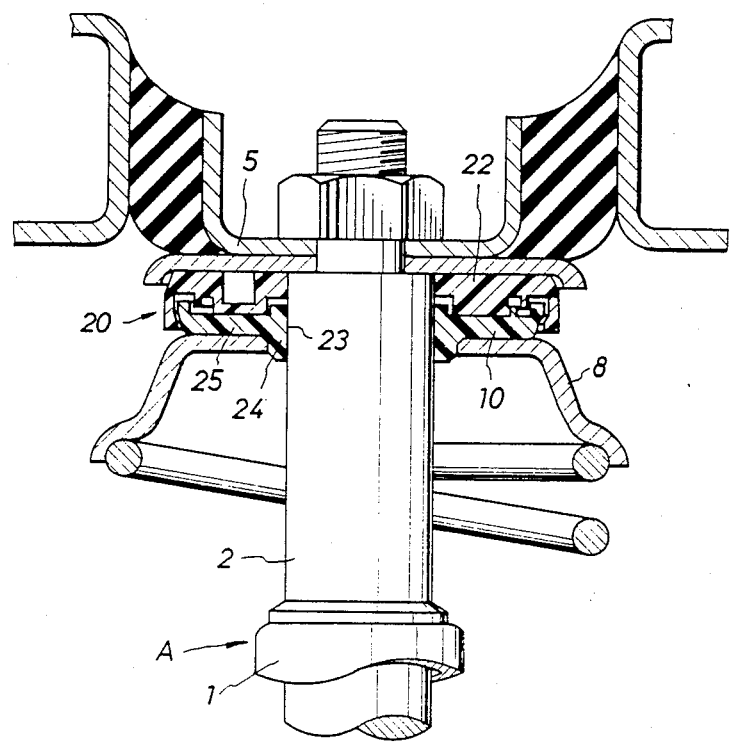
FIG. 10 is a longitudinal cross sectional view of a strut assembly equipped with a second thrust bearing according to the present invention.
Figure 11:
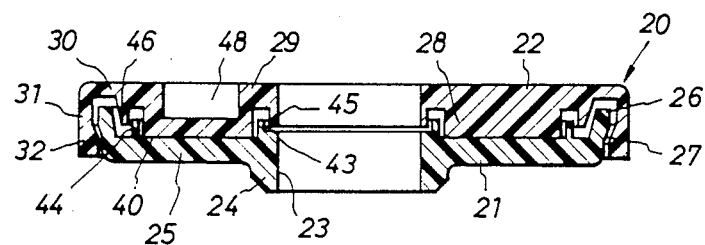
FIG. 11 is a longitudinal cross sectional view of one embodiment of the third thrust bearing according to the present invention.
Figure 12:
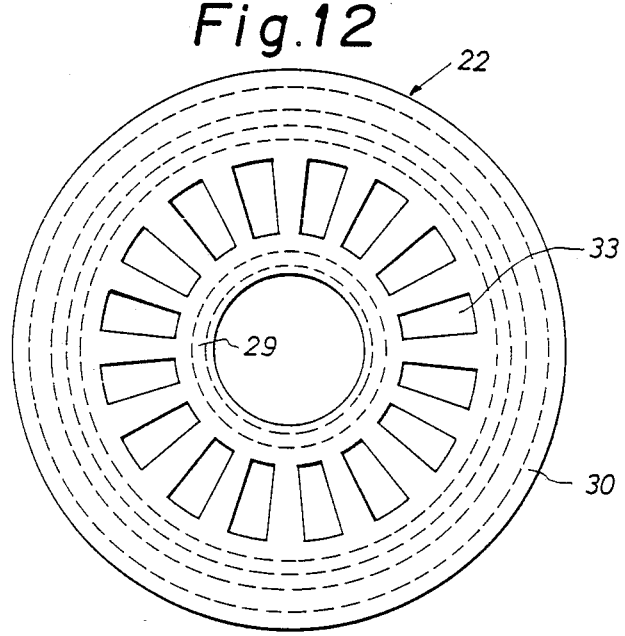
FIG. 12 is a plan view for the bearing body shown in FIG. 11.
Figure 13:
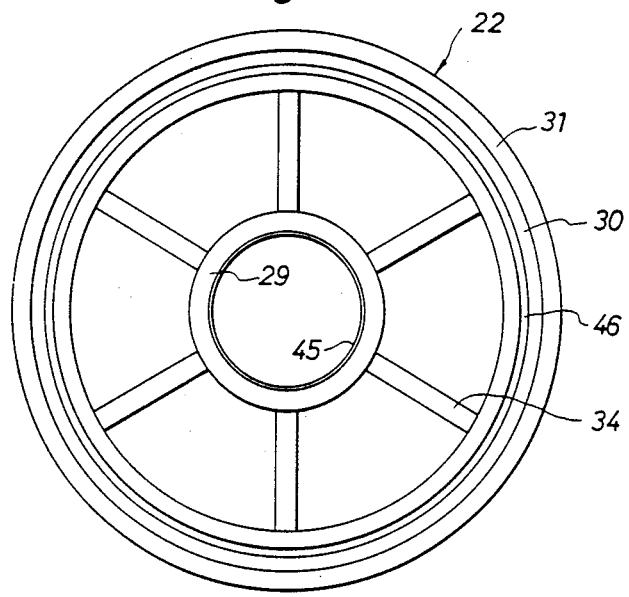
FIG. 13 is a bottom view for the bearing body shown in FIG. 11.
Figure 14:
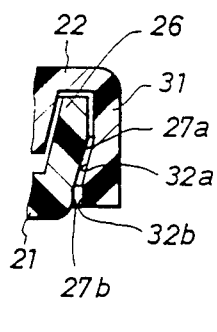
FIG. 14 is an enlarged cross sectional view for a part in a snap-fit portion shown in FIG. 11.

FIG. 10 illustrates an embodiment in which the second thrust bearing 20 described above is applied to a strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the upper surface of the bearing body 22 is abutted against the mounting member 5.

Explanation will be made specifically for one embodiment of a third thrust bearing according to the present invention referring to FIGS. 11 through 14 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, an annular inner lower lip portion 43 disposed to an upper end surface of the cylindrical portion 24 and having an aperture of a diameter enlarging with a step from the penetration aperture 23, a large width collar portion 25 formed integrally with an outer circumferential surface at the end of the cylindrical portion 24, an annular protruded portion 26 formed integrally with an outer circumferential edge of the collar portion 25, an engaging portion 27 formed to an outer circumferential surface of the protruded portion 26 and an annular outer lower lip portion 44 coaxially formed with the penetration aperture 23 at an upper surface of the collar portion 25 and defining an annular groove 40 in cooperation with the annular inner lower lip portion 43.

The engaging portion 27 consists of a tapered surface portion 27a formed from the outer circumferential surface of the protruded portion 26 to the lower circumferential surface of the collar portion 25 and a cylindrical surface portion 27b continuous with the tapered surface portion 27a and reaching the lower surface of the collar portion 25.

The bearing body 22 includes a cylindrical bearing portion 28, an annular inner collar portion 29 formed integrally with an upper end of an inner circumferential surface of the bearing portion 28, an annular inner upper lip portion 45 protruding downwardly in continuous with an inner circumferential edge of the collar portion 29 and having an inner diameter equal with the diameter of the penetration aperture 23 of the casing 21 and an outer diameter smaller than the inner diameter of the inner lower lip portion 43, an annular outer collar portion 30 formed integrally with an upper end at the outer circumferential surface of the bearing portion 28, an annular suspended portion 31 formed integrally with an outer circumferential edge of the collar portion 30, an engaging hook portion 32 formed at a lower end of the suspended portion 31 and an annular outer upper lip portion 46 formed coaxially with the bearing portion 28 to a lower surface of the collar portion 30 and having an inner diameter greater than an outer diameter of the outer lower lip portion 44 formed to the upper surface of the collar portion 25 of the casing 21.

The hook portion 32 consists of a tapered surface portion 32a corresponding to the tapered surface portion 27a that constitutes the engaging portion 27 of the casing 21 and a cylindrical surface portion 32b in continuous with the tapered surface portion 32a and corresponding to the cylindrical surface portion 27b of the engaging portion 27.

The bearing body 22 is fitted rotatably to the casing 21 by snap-fitting the hook portion 32 of the suspended portion 31 with the engaging portion 27 of the casing 21 and by radially overlapping the ends of the inner and outer upper lip portions 45, 46 respectively with the inner and outer lower lip portions 43, 44 of the casing 21, whereby tight seals are formed by the labyrinth effect in the snap-fit portion, in the inner upper and lower lip portions and in the outer upper and lower lip portions.

A plurality of recesses 33 are formed radially at the upper surface of the bearing portion 28 of the bearing body 22, so that the thickness of the bearing body 22 is made uniform as much as possible by the recesses 33.

A plurality of grooves 34 are formed each at a circumferential pitch at the lower surface of the bearing portion 28 of the bearing body 22 and each groove 34 is formed radially from the inner circumferential surface to the outer circumferential surface, and the grooves 34 constitute an oil reservoir for grease or like other lubricant. The bearing portion 28 of the bearing body 22 is disposed within the groove 40 such that the lower surface of the bearing portion 28 is slidably abutted against the bottom surface of the groove 40 of the casing 21.

The sliding face defined with the lower surface of the bearing portion 28 of the bearing body 22 and the bottom face of the groove 40 is protected against the intrusion of dust or the like from the inner and the outer circumferential surfaces of the thrust bearing 20 by the labyrinth effect due to the tight seals formed in the snap-fit portion, in the overlapped portion between the inner upper and lower lip portions 45, 43 and the overlapped portion between the outer upper and lower lip portions 46, 44 respectively.

Figure 15:
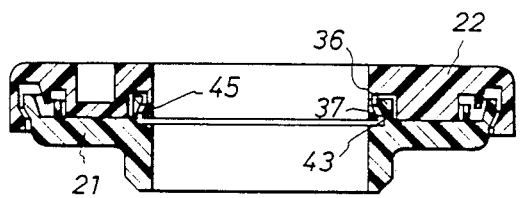
FIG. 15 is a longitudinal cross sectional view of another embodiment of the third thrust bearing according to the present invention.

FIG. 15 is a longitudinal cross sectional view illustrating another embodiment of the third thrust bearing according to the present invention.

In this embodiment, an engaging portion 36 is formed to the inner circumferential surface of the inner lower lip portion 43 of the casing 21, while an engaging hook portion 37 is formed to the outer circumferential surface of the inner upper lip portion 45 of the bearing body 22 in the aforementioned embodiment of the third thrust bearing. Both of the engaging portion 36 and the hook portion 37 are snap-fit to each other and fitted in a relatively rotatable manner.

Figure 16:
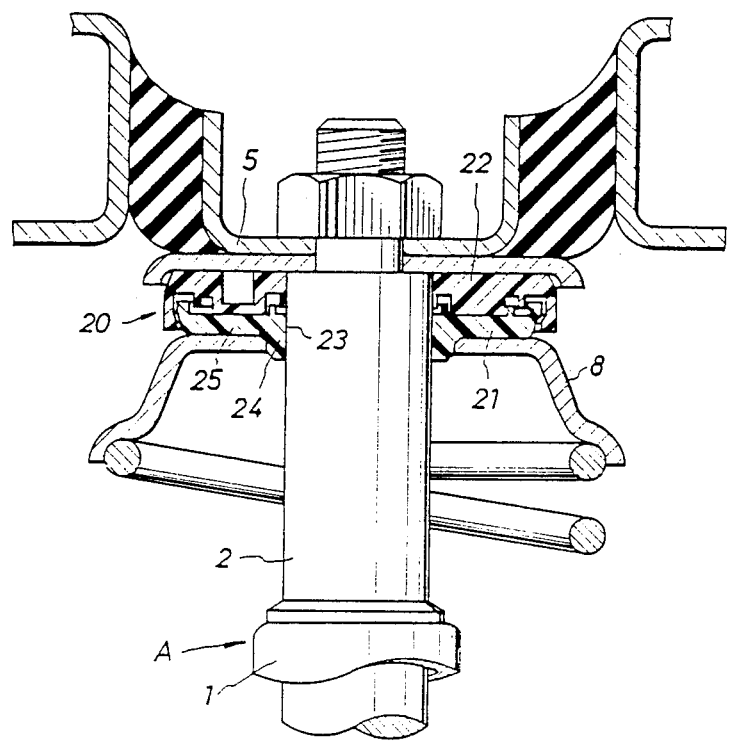
FIG. 16 is a longitudinal cross sectional view of a strut assembly equipped with a third thrust bearing according to the present invention.

FIG. 16 illustrates an embodiment in which one embodiment of the third thrust bearing described above is applied to a strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the upper surface of the bearing body 22 is abutted against the mounting member 5.

Figure 19:
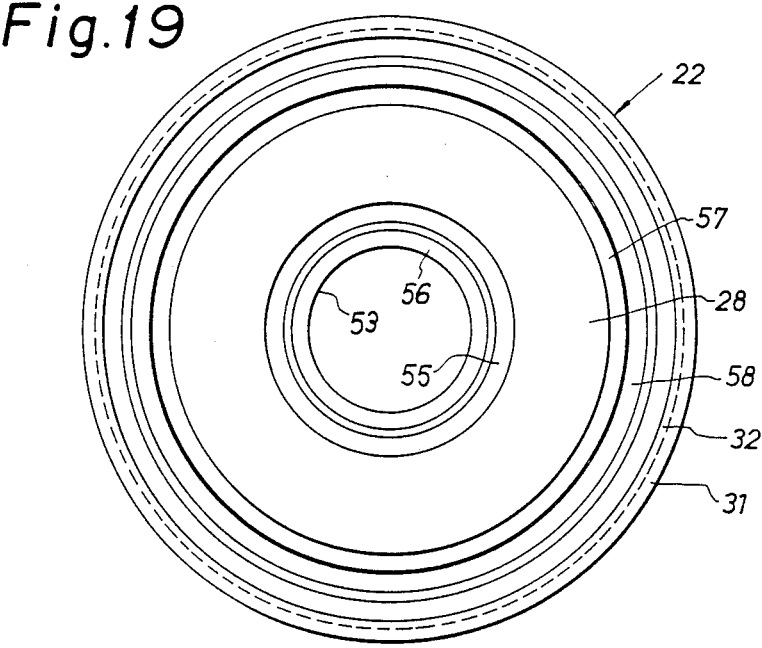
FIG. 19 is a bottom view for the bearing body shown in FIG. 17.

Explanation will be made specifically for one embodiment of a fourth thrust bearing according to the present invention referring to FIGS. 17 through 19 of the accompanying drawings.

A thrust bearing 20 comprises a casing 21 made of synthetic resin and a bearing body 22 made of synthetic resin slidably fitted to the casing 21.

The casing 21 includes a cylindrical portion 24 having a penetration aperture 23 being along a longitudinal direction thereof, a large width collar portion 25 formed integrally with an outer circumferential surface at the end of the cylindrical portion 24, an annular protruded portion 26 formed integrally with an outer circumferential edge of the collar portion 25, an engaging step 50 formed to the outer circumferential surface of the protruded portion 26, a substantially cylindrical lower bearing portion 51 formed integrally with and protruded from an upper surface of the collar portion 25 and an annular ridge portion 52 formed continuous with the inner circumferential edge of the bearing portion 51 and protruded from the end of the bearing portion 51.

The bearing body 22 comprises a disk-like portion 54 having at its central portion thereof a circular aperture 53 in communication with the penetration aperture 23 of the casing 21, a cylindrical upper bearing portion 28 formed integrally with the lower surface of the disk-like portion 54, an annular inner protruded portion 56 spaced apart from an inner circumferential surface of the bearing portion 28 by an annular inner groove 55, protruded at a leading end thereof from an end face of the bearing portion 28 and formed continuous with the circular aperture 53, an annular outer protruded portion 58 spaced apart from an outer circumferential surface of the bearing portion 28 by an outer annular groove 57 and protruded at a leading end thereof from the end face of the bearing portion 28 and an annular suspended portion 31 formed at an outer circumferential edge of the disk-like portion 54 and having an engaging hook portion 32 at a leading end thereof.

The bearing body 22 is fitted rotatably to the casing 21 by snap-fitting the hook portion 32 of the suspended portion 31 with the engaging step 50 of the casing 21 such that the end face of the bearing portion 28 is abutted slidably against the end face of the bearing portion 51 at the upper surface of the collar portion 25 and the ends of the inner and the outer protrusions 56, 58 are protruded from the end faces of the bearing portions 28, 51 respectively.

Since the sliding face between the end face of the bearing portion 28 and the end face of the bearing portion 51 is formed at a position higher than the upper surface 59 of the collar portion 25 by the combination of the casing 21 and the bearing body 22 and since the inner and outer protrusions 56, 58 of the bearing body 22 are disposed while being protruded from the sliding face, intrusion of dust or the like from the outside to the sliding face can be prevented by the labyrinth effect due to the tight seal formed in the inner and outer circumferential edges of the sliding face and the tight seal formed in the snap-fit portion between the bearing member 22 and the casing 21.

Figure 20:
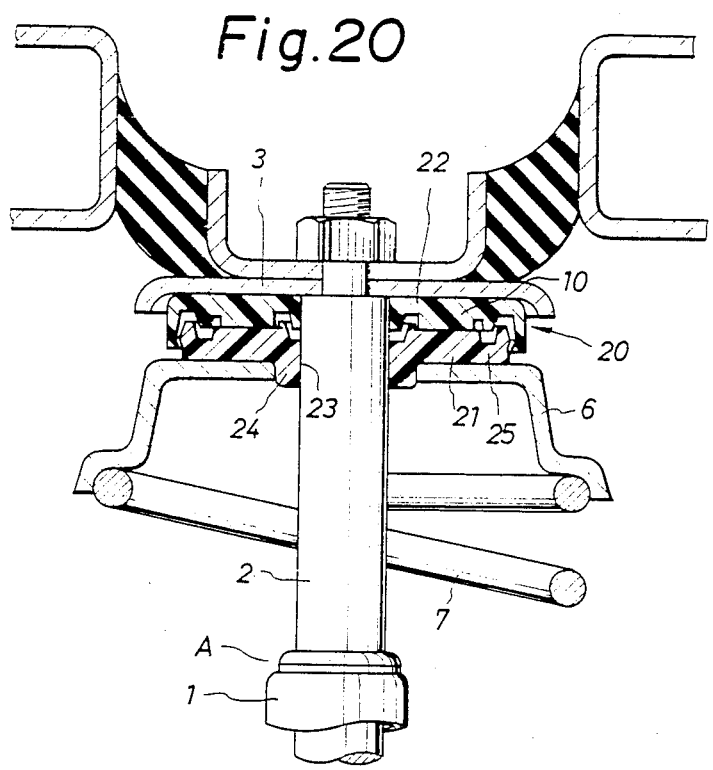
FIG. 20 is a longitudinal cross sectional view of a strut assembly equipped with a fourth thrust bearing according to the present invention.

FIG. 20 illustrates an embodiment in which the thrust bearing 20 comprising one embodiment of the fourth thrust bearing described above is applied to the strut assembly A.

Specifically, the piston rod 2 of the strut 1 passes through the penetration aperture 23 in the cylindrical portion 24 of the casing 21, the outer circumferential surface of the cylindrical portion 24 of the casing 21 is fitted into the aperture of the upper spring seat 8, the lower surface of the collar portion 25 of the casing 21 is abutted against the flat portion 10 of the seat 8 and the bearing body 22 is abutted against the mounting member 5.

Figure 21:
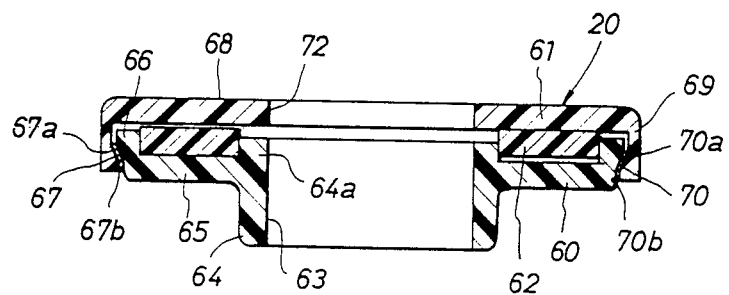
FIG. 21 is a longitudinal cross sectional view of one embodiment of the fifth thrust bearing according to the present invention.
Figure 22:
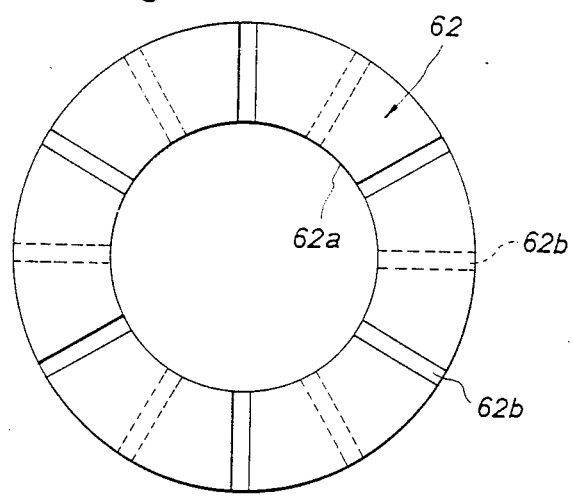
FIG. 22 is a plan view for the bearing piece shown in FIG. 21.

Explanation will be made specifically for one embodiment of a fifth thrust bearing according to the present invention referring to FIGS. 21 and 22 of the accompanying drawings.

A thrust bearing 20 comprises a lower casing 60 made of synthetic resin, an upper casing 61 made of synthetic resin and a bearing piece 62 made of synthetic resin disposed within the upper and lower casings 60,61.

The lower casing 60 includes a cylindrical portion 64 having a penetration aperture 63 being along a longitudinal direction thereof, a large width collar portion 65 formed integrally with an outer circumferential surface of the cylindrical portion 64 in a state where one end 64a of the cylindrical portion 64 is protruded therefrom, an annular protruded portion 66 formed integrally with an outer circumferential edge of the collar portion 65 and an engaging portion 67 formed to an outer circumferential surface of the protruded portion 66.

The engaging portion 67 consists of a tapered surface portion 67a formed from an outer circumferential surface of the protruded portion 66 to a lower surface of the collar portion 65 and a cylindrical surface portion 67b in continuous with the tapered surface portion 67a and reaching the lower surface of the collar portion 65.

The casing 61 includes a disk-like flat portion 68, a circular aperture 72 formed at a center of the flat portion 68 and having the same diameter as that of the penetration aperture 63, an annular suspended portion 69 formed integrally with an outer circumferential edge of the flat portion 68 and an engaging hook portion 70 formed at a lower end of the suspended portion 69. The hook portion 70 consists of a tapered surface portion 70a corresponding to the tapered surface portion 67a constituting the engaging portion 67 of the casing 60 and a cylindrical surface portion 70b continuous with the tapered surface portion 70a and corresponding to the cylindrical surface portion 67b of the engaging portion 67.

The casing 61 is fitted rotatably to the casing 60 by snap-fitting the hook portion 70 of the suspended portion 69 with the engaging portion 67 of the casing 60, thereby a tight seal is formed by the labyrinth effect in the snap-fit portion.

The bearing piece 62 comprises an annular plate having an inner aperture 62a of an inner diameter greater than the outer diameter of the cylindrical portion 64 of the casing 60 and an outer diameter smaller than the inner diameter of the protruded portion 66 of the casing 60.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant. The bearing piece 62 is disposed within the casings 60, 62 such that the inner aperture 62a is engaged with the outer circumferential surface of one end 64a of the cylindrical portion 64 and the both end faces of the bearing piece 62 are slidably abutted against the lower surface of the disk-like portion 68 of the casing 61 and the upper surface of the collar portion 65 of the casing 60 respectively.

Figure 23:
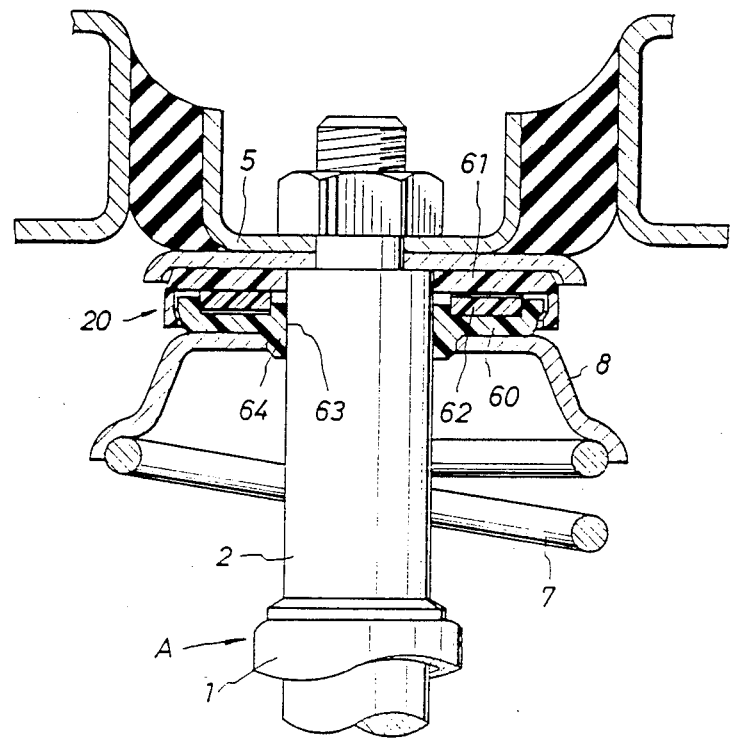
FIG. 23 is a longitudinal cross sectional view of a strut assembly equipped with a fifth thrust bearing according to the present invention.

FIG. 23 illustrates an embodiment in which one embodiment of the fifth thrust bearing according to the invention as described above is applied to the strut assembly A.

Specifically, the piston rod 2 of the strut 1 passes through the penetration aperture 63 of the cylindrical portion 64 of the casing 60 and the circular aperture 72 of the disk-like portion 68 of the casing 61, the cylindrical portion 64 of the casing 60 is fitted into the aperture of the upper spring seat 8 and the lower surface of the collar portion 65 of the casing 60 is abutted against the flat portion 10 of the seat 8, and the upper surface of the disk-like portion 68 of the casing 61 is abutted against the mounting member 5.

Figure 24:
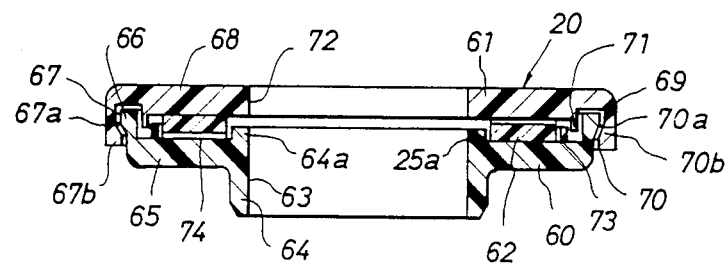
FIG. 24 is a longitudinal cross sectional view of one embodiment of a sixth thrust bearing according to the present invention.
Figure 25:
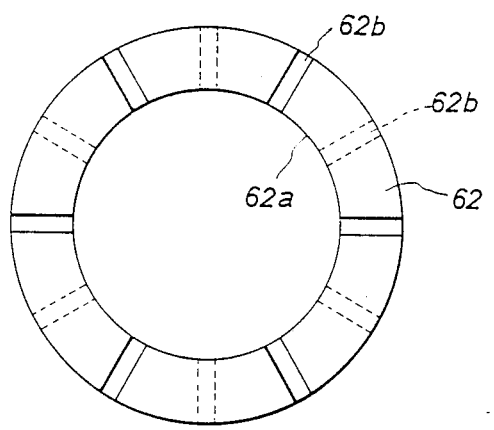
FIG. 25 is a plan view for the bearing piece shown in FIG. 24.

Explanation will be made specifically for one embodiment of a sixth thrust bearing according to the present invention referring to FIGS. 24 and 25 of the accompanying drawings.

A thrust bearing 20 comprises a lower casing 60 made of synthetic resin, an upper casing 61 made of synthetic resin and a bearing piece 62 made of synthetic resin disposed within the upper and lower casings 61, 60.

The lower casing 60 includes a cylindrical portion 64 having a penetration aperture 63 being along a longitudinal direction thereof, a large width collar portion 65 formed integrally with an outer circumferential surface at the end of the cylindrical portion 64 in a state where one end 64a of the cylindrical portion 64 is protruded therefrom, an annular protruded portion 66 formed integrally with an outer circumferential edge of the collar portion 65, an engaging portion 67 formed to the outer circumferential surface of the protruded portion 66 and an annular lower lip 73 formed coaxially with the penetration aperture 63 at the upper surface of the collar portion 65 and defining an annular groove 74 in cooperation with one end 64a of the cylindrical portion 64.

The engaging portion 67 consists of a tapered surface portion 67a formed from an outer circumferential surface of the protruded portion 66 to a lower surface of the collar portion 65 and a cylindrical surface portion 67b continuous with the tapered surface portion 67a and reaching the lower surface of the collar portion 65.

The casing 61 includes a disk-like flat portion 68, a circular aperture 72 formed at a center of the disk-like portion 68 and having the same diameter as that of the penetration aperture 63, an annular suspended portion 69 formed integrally with an outer circumferential edge of the disk-like portion 68, an engaging hook portion 70 formed at a lower end of the suspended portion 69 and an annular upper lip portion 71 formed coaxially with the circular aperture 72 at a lower surface of the disk-like portion 68 and having an inner diameter greater than the lower lip portion 73 formed to the upper surface of the collar portion 65 of the casing 60. The hook portion 70 consists of a tapered surface portion 70a corresponding to the tapered surface portion 67a constituting the engaging portion 67 of the casing 60 and a cylindrical surface portion 70b continuous with the tapered surface portion 70a and corresponding to the cylindrical surface portion 67b of the engaging portion 67.

The casing 61 is fitted rotatably to the casing 60 by snap-fitting the hook portion 70 of the suspended portion 69 with the engaging portion 67 of the casing 60 and by radially overlapping the end of the upper lip portion 71 with the lower lip portion 73 of the casing 60, whereby tight seals are formed by the labyrinth effect in the snap-fit portion and in the upper and lower lip portions.

The bearing piece 62 comprises an annular plate having an inner aperture 62a of an inner diameter greater than the outer diameter of one end 64a of the cylindrical portion 64 and an outer diameter smaller than the inner diameter of the lower lip portion 73 of the casing 60.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant.

The bearing piece 62 is disposed within the groove 74 of the casing 60 such that the inner aperture 62a is engaged with the outer circumferential surface of one end 64a of the cylindrical portion 64, and the both end faces of the bearing piece 62 are slidably abutted against the lower surface of the disk-like portion 68 of the casing 61 and the bottom surface of the groove 74 of the casing 60 respectively.

The sliding face of the bearing defined with both end faces of the bearing piece 62, the lower surface of the disk-like portion 68 of the casing 61 and the bottom face of the groove 74 of the casing 60 abutted slidably against the both end faces is protected against the intrusion of dust or the like by the labyrinth effect due to tight seals formed in the snap-fit portion and in the overlapped portions between the upper and lower lip portions 71, 73 of the casings 60, 61.

Figure 26:
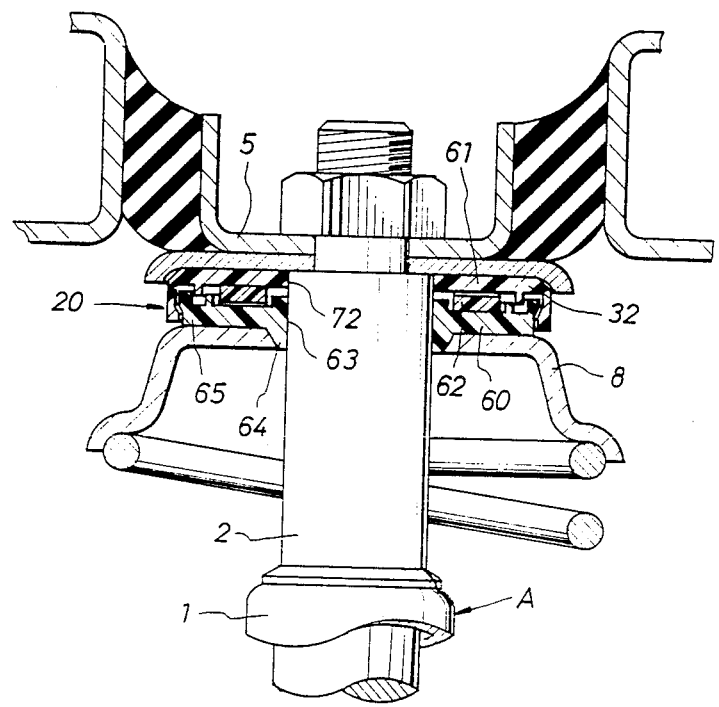
FIG. 26 is a longitudinal cross sectional view of a strut assembly equipped with a sixth thrust bearing according to the present invention.

FIG. 26 illustrates an embodiment in which one embodiment of the sixth thrust bearing according to the present invention is applied to a strut assembly A.

Specifically, the piston rod 2 of the strut 1 passes through the penetration aperture 63 of the cylindrical portion 64 of the casing 60 and through the circular aperture 72 of the disk-like portion 68 of the casing 61, the cylindrical portion 64 of the casing 60 is fitted into the aperture of the upper spring seat 8, the lower surface of the collar portion 65 of the casing 60 is abutted against the flat portion 10 of the seat 8, and the upper surface of the disk-like portion 68 of the casing 61 is abutted against the mounting member 5.

Explanation will be made specifically for one embodiment of the seventh thrust bearing according to the present invention referring to FIGS. 27a, 27b, 27c, 27d and 28 of the accompanying drawings.

A thrust bearing 20 comprises a lower casing 60 made of synthetic resin, an upper casing 61 made of synthetic resin and a bearing piece 62 made of synthetic resin disposed within the upper and lower casings 61, 60.

The casing 60 includes a cylindrical portion 64 having a penetration aperture 63 being along a longitudinal direction thereof, an annular inner lower lip portion 75 disposed to an upper end face of the cylindrical portion 64 and having aperture of a diameter enlarging with a step from the penetration aperture 63, a large width collar portion 65 formed integrally with an outer circumferential surface at the end of the cylindrical portion 64 in a state where one end 64a of the cylindrical portion 64 is protruded therefrom, an annular protruded portion 66 formed integrally with an outer circumferential edge of the collar portion 65, an engaging portion 67 formed to an outer circumferential surface of the protruded portion 66 and an annular outer lower lip portion 76 formed coaxially with the penetration aperture 63 at an upper surface of the collar portion 65 and defining an annular groove 74 in cooperation with the inner lower lip portion 75. The inner diameter of the inner lower lip 75 is larger than that of the penetration aperture 63.

The engaging portion 67 consists of a tapered surface portion 67a formed from the outer circumferential surface of the protruded portion 66 to the lower surface of the collar portion 65 and a cylindrical surface portion 67b continuous with the tapered surface portion 67a and reaching the lower surface of the collar portion 65.

The casing 61 includes a disk-like flat portion 68, a circular aperture 72 formed at a center of the disk-like portion 68, an annular inner upper lip 77 formed integrally with and extended downwardly from the inner circumferential edge of the disk like portion 68 and having an outer diameter smaller than the inner diameter of the inner lower lip portion 75, an annular suspended portion 69 formed integrally with the outer circumferential edge of the disk-like portion 68, an engaging hook portion 70 formed at a lower end of the suspended portion 69 and an annular outer upper lip portion 78 formed coaxially with the circular aperture 72 to a lower surface of the disk-like portion 68 and having an inner diameter greater than that of the outer lower lip portion 76. The hook portion 70 consists of a tapered surface portion 70a corresponding to the tapered surface portion 67a constituting the engaging portion 67 of the casing 60 and a cylindrical surface portion 70b in contiguous with the tapered surface portion 67a and corresponding to the cylindrical surface 67b of the engaging portion 67.

The casing 61 is fitted rotatably to the lower casing 60 by snap-fitting the hook portion 70 of the suspended portion 69 with the engaging portion 67 of the casing 60 and by radially overlapping the ends of the inner upper lip portion 77 and the outer upper lip portion 78 with the inner lower lip portion 75 and the outer lower lip portion 76 respectively, whereby tight seals are formed by the labyrinth effect in the snap-fit portion, in the overlapped portion between the inner upper and lower lip portions and in the overlapped portion between the outer upper and lower lip portions.

The bearing piece 62 comprises an annular plate having an inner aperture 62a of an inner diameter greater than the outer diameter of the inner lower lip portion 75 and an outer diameter smaller than the inner diameter of the outer lower lip portion 76 of the casing 60.

A plurality of grooves 62b are formed radially from the inner aperture 62a to the outer circumferential surface alternately on both end faces of the bearing piece 62 at a phase difference of 30 degree with each other in the circumferential direction, and the grooves 62b constitute an oil reservoir for grease or like other lubricant.

The bearing piece 62 is disposed within the groove 74 of the casing 60 such that the inner aperture 62a is engaged with the other circumferential surface of one end 64a of the cylindrical portion 64, both end faces of the bearing piece 62 are slidably abutted against the lower surface of the disk-like portion 68 of the casing 61 and the bottom face of the groove 74 of the casing 60 respectively.

The sliding face of the bearing defined with the both end faces of the bearing piece 62, the lower surface of the disk-like portion 68 of the casing 61 and the bottom face of the groove 74 of the casing 60 abutted slidably against the both end faces is protected against the intrusion of the dust or the like from the inner and the outer circumferential surfaces of the bearing piece 62 by the labyrinth effect due to the tight seals formed in the snap-fit portion between the casing 60, 61, in the overlapped portion between the inner upper and lower lip portions 77, 75 and in the overlapped portion between the outer upper and lower lip portions 78, 76 respectively.

Figure 27A:
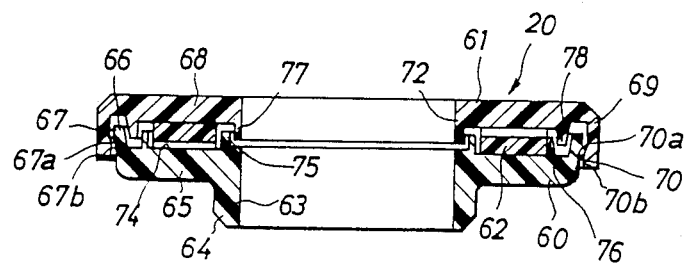
FIG. 27a is a longitudinal cross sectional view of one embodiment of a seventh thrust bearing according to the present invention.
Figure 27B:
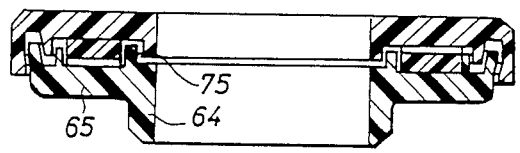
FIGS. 27b to 27d are longitudinal cross sectional views of variant embodiments of the thrust bearing shown in FIG. 27a, respectively.
Figure 27C:
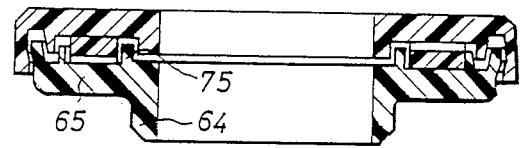
Figure 27D:
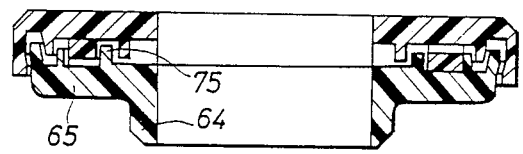
Figure 28:
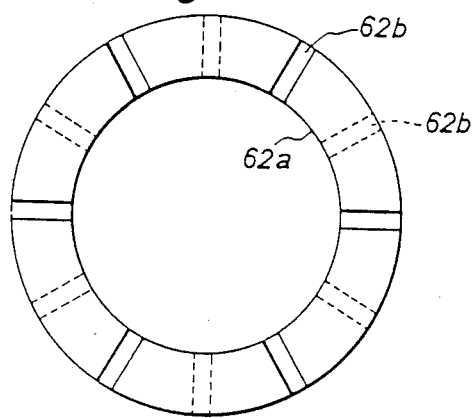
FIG. 28 is a plan view for the bearing piece shown in FIG. 27.

The thrust bearings shown in FIGS. 27b to 27d are variant embodiments of the seventh thrust bearing according to the present invention shown in FIG. 27a.

Each of the thrust bearings shown in FIGS. 27b to 27d has the same construction as that of the embodiment of the seventh thrust bearing shown in FIG. 27a, except that a position of the inner lower lip portion 75 is different from the position of the inner lower lip portion 75 in the embodiment shown in FIG. 27a.

In the variant embodiment shown in FIG. 27b, the inner lower lip portion 75 is disposed on the boundary between the cylindrical portion 64 and the collar portion 65.

In the variant embodiment shown in FIG. 27c, the inner lower lip portion 75 is disposed on a portion of the collar portion 65, which portion is adjacent to the boundary between the cylindrical portion 64 and the collar portion 65.

In the variant embodiment shown in FIG. 27d, the inner lower lip portion 75 is disposed on a portion of the collar portion 65, which portion is distant from the boundary between the cylindrical portion 64 and the collar portion 65.

Figure 29:
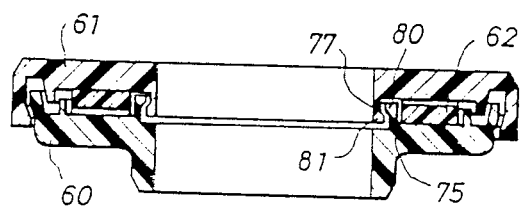
FIG. 29 is a longitudinal cross sectional view of another embodiment of a seventh thrust bearing according to the present invention.

FIG. 29 is a longitudinal cross sectional view illustrating another embodiment of the seventh thrust bearing according to the present invention.

Specifically, in this embodiment, another engaging portion 80 is formed to the inner circumferential surface of the inner lower lip portion 75 of the casing 60, while another engaging hook portion 81 is formed to the outer circumferential surface of the upper lip portion 77 at the central of the casing 61 in the aforementioned embodiment of the seventh thrust bearing. Both of the engaging portion 80 and the hook portion 81 are snap-fit to each other in a relatively rotatably manner.

Figure 30:
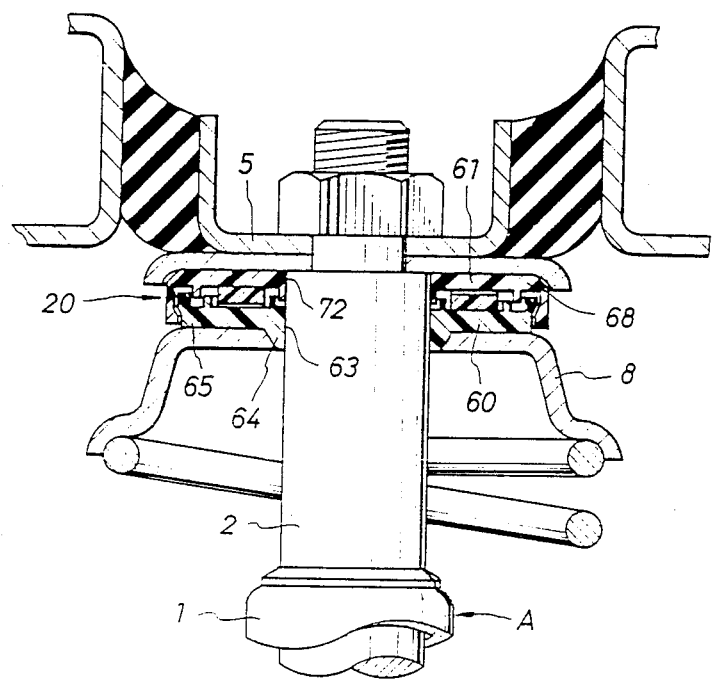
FIG. 30 is a longitudinal cross sectional view of a strut assembly equipped with a seventh thrust bearing according to the present invention.
Figure 31:
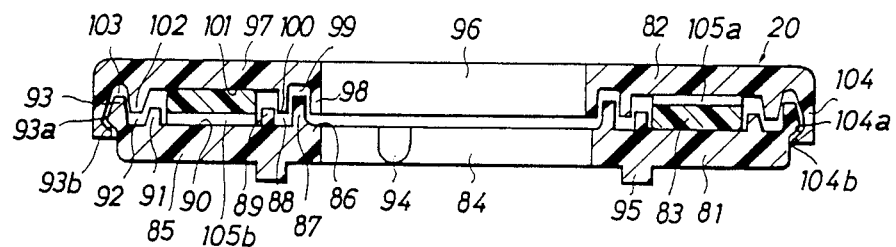
FIG. 31 is a longitudinal cross sectional view of a strut assembly equipped with an eighth thrust bearing according to the present invention.
Figure 32:
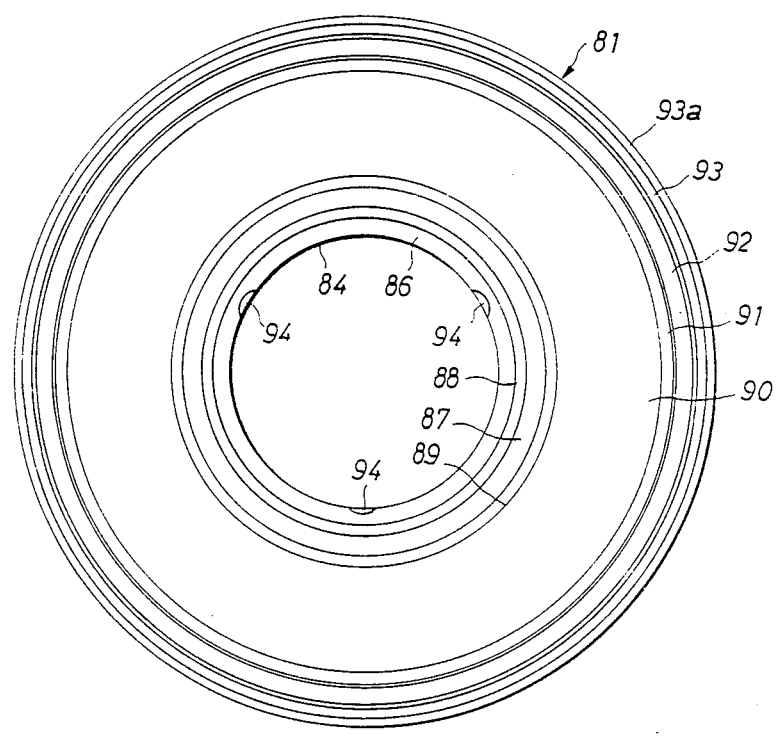
FIG. 32 is a plan view for the lower casing shown in FIG. 31.
Figure 33:
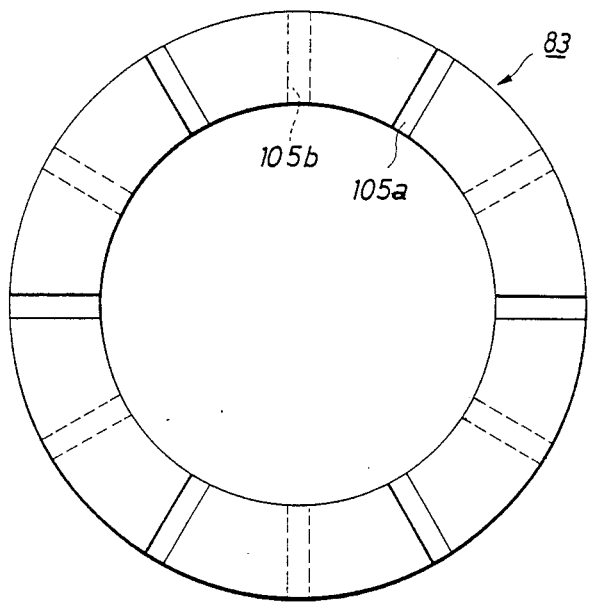
FIG. 33 is a plan view for the bearing piece shown in FIG. 31.

FIG. 30 illustrates an embodiment in which one embodiment of the seventh thrust bearing according to the present invention is applied to a strut assembly A.

Specifically the piston rod 2 of the strut 1 passes through the penetration aperture 63 in the cylindrical portion 64 of the casing 60 and the circular aperture 72 of the disk-like portion 68 of the casing 61, the cylindrical portion 64 of the casing 60 is fitted into the aperture of the upper spring seat 8, the lower surface of the collar portion 65 of the casing 60 is abutted against the flat portion 10 of the seat 8, and the upper surface of the disk-like portion 68 of the casing 61 is abutted against the mounting member 5.

Explanation will be made specifically for one embodiment of the eighth thrust bearing according to the present invention referring to FIG. 31 to FIG. 35 of the accompanying drawings.

A thrust bearing 20 comprises a lower casing 81 made of synthetic resin, an upper casing 82 made of synthetic resin and a bearing piece 83 made of synthetic resin disposed within the upper and lower casings 82, 81.

The casing 81 includes a disk-like portion 85 having at a central portion thereof a penetration aperture 84 which is along a longitudinal direction thereof, an annular innermost lower lip portion 87 extending upwardly from an upper surface of the disk-like portion with an annular step 86 in continuous with the penetration aperture 84, an annular inner lower lip portion 89 protruding upwardly from the upper surface of the disk-like portion 85 so as to form an innermost annular groove 88 in cooperation with the innermost lower lip portion 87, an annular outer lower lip portion 91 protruding upwardly from the upper surface of the disk-like portion 85 so as to form an inner annular groove 90 in cooperation with the annular inner lower lip portion 89, and an annular protruded portion 93 formed integrally with an outer circumferential edge of the disk-like portion 85 so as to form an outer annular groove 92 in cooperation with the annular outer lower lip portion 91.

The annular protruded portion 93 comprises a tapered surface portion 93a extending downwardly from a top edge of an outer circumferential surface thereof, and a tapered surface portion 93b connected continuously to the tapered surface portion 93a to thereby form an annular angular-ridge portion in cooperation with the tapered surface portion 93a, and reaching an outer circumferential surface of the disk-like portion 85. These two tapered surface portions 93a, 93b forms an outwardly engaging portion.

A plurality of grooves 94 are disposed on a wall surface defining the penetration aperture 84. The grooves 94 are arranged along a circumference of the penetration aperture 84 and extend in an axial direction of the penetration aperture 84. The grooves 94 serve as an oil reservoir for lubricant such as grease.

Reference numeral 95 designates protrusions used as a whirl-stop, which protrusions 95 are formed on a lower surface of the disk-like portion 85 of the lower casing 81 so as to oppose to each other with respect to the penetration aperture 84.

The upper casing 82 comprises a disk-like portion 97, a penetration aperture 96 formed at a central portion of the disk-like portion 97, and having the same diameter as that of the penetration aperture 84 of the lower casing 81, an annular innermost upper lip portion 98 formed integrally with and extending downwardly from an inner circumferential edge of the disk-like portion 97, an annular inner upper lip portion 100 extending downwardly from a lower surface of the disk-like portion 97 so as to form an innermost annular groove 99 in an axially outward direction in cooperation with the innermost upper lip portion 98, an annular outer upper lip portion 102 extending downwardly from the lower surface of the disk-like portion 97 so as to form an inner annular groove 101 in cooperation with the inner upper lip portion 100, and an annular suspended portion 104 formed integrally with an outer circumferential edge of the disk-like portion 97 so as to form an outer annular groove 103 in cooperation with the outer upper lip portion 102.

The annular suspended portion 104 comprises a tapered surface portion 104a disposed on an inner circumferential surface of the annular suspended portion 104, and corresponding to the tapered surface portion 93a constituting the annular protruded portion 93 of the lower casing 81, and a tapered surface portion 104b connected continuously to the tapered surface portion 104a to thereby form an annular angular-recess portion in cooperation with the tapered surface portion 104a. These two tapered surface portions 104a, 104b form an engaging hook portion.

The upper casing 82 is fitted rotatably to the lower casing 81 by snap-fitting the engaging hook portion of the annular suspended portion 104 with the engaging portion of the annular protruded portion 93 of the lower casing 81, by engaging the annular inner and outer upper lip portions 100, 102 with the annular grooves 88, 92 of the lower casing 81, respectively, and by engaging the innermost annular upper lip portion 98 with the annular step 86 of the lower casing 81.

The snap-fit of the upper casing 82 to the lower casing 81 produces tightly sealed portions between the upper and lower casings 82, 81, which tightly sealed portions are caused by the labyrinth effect in the snap-fit portion between the annular suspended portion 104 and the annular protruded portion 93, in the engaging portion between the annular inner upper lip portion 100 and the annular groove 88, in the engaging portion between the outer upper lip portion 102 and the annular groove 92, and in the engaging portion between the innermost upper lip portion 98 and the annular step 86.

The bearing piece 83 made of synthetic resin and received between the upper and lower casings 82, 81 comprises an annular plate having an inner diameter greater than the outer diameter of the inner lower lip portion 89 of the lower casing 81 and an outer diameter smaller than the inner diameter of the outer lower lip portion 91, of the lower casing 81.

A plurality of grooves 105a and 105b are radially formed alternately on both end faces of the bearing piece 83 such that the grooves 105a are respectively arranged along the circumference of the bearing piece 83 at a phase difference of 30 degree with respect to the grooves 105b adjacent to the grooves 105a. The grooves 105a, 105b constitute an oil reservoir for lubricant such as grease.

The sliding face of the bearing defined by both end faces of the bearing piece 83, the lower surface of the annular groove 101 of the upper casing 82 and the bottom face of the annular groove 90 of the lower casing 81, which lower surface and bottom face abut slidably respectively against the end faces, is protected against the intrusion of dust or the like from the inner and outer circumferential surfaces of the bearing piece 83 by the labyrinth effect due to the tightly sealed portions formed in the snap-fit portion between the annular suspended portion 104 of the upper casing 82 and the annular protruded portion 93 of the lower casing 81, in the engaging portion between the inner upper lip portion 100 and the annular groove 88, in the engaging portion between the outer upper lip portion 102 and the annular groove 92, and in the engaging portion between the annular innermost upper lip portion 98 and the annular step 86.

Figure 34:
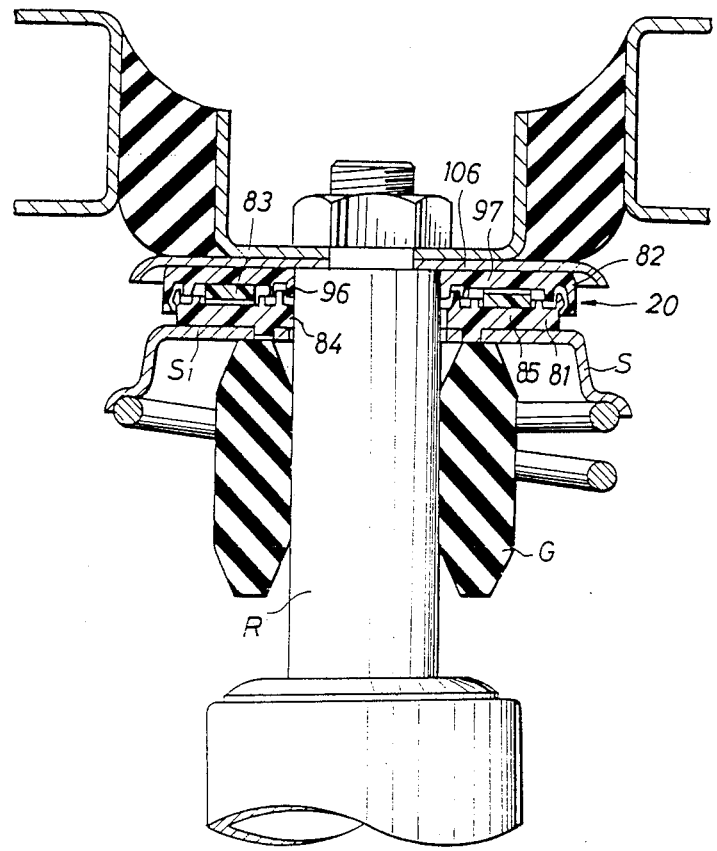
FIG. 34 is a longitudinal cross sectional view of a strut assembly equipped with an eighth thrust bearing according to the present invention, shown in FIG. 31.

FIG. 34 illustrates an embodiment in which one embodiment of the eighth thrust bearing according to the present invention is applied to a strut assembly.

Specifically the piston rod R of the strut assembly passes through the penetration aperture 84 of the disk-like portion 85 of the lower casing 81 and the penetration aperture 96 of the disk-like portion 97 of the upper casing 82, the lower surface of the disk-like portion 85 of the lower casing 81 is abutted against the flat portion $S_1$ of the upper spring seat S, the protrusions 95 disposed on the lower surface of the disk-like portion 85 are fitted into fitting apertures disposed in the flat portion $S_1$ of the upper spring seat S, the upper surface of the disk-like portion 97 of the upper casing 82 being abutted against the mounting member 106 situated on the vehicle side.

In the FIG. 34, there is a coil spring, mark G being a bump-stopper (rubber).

Figure 35:
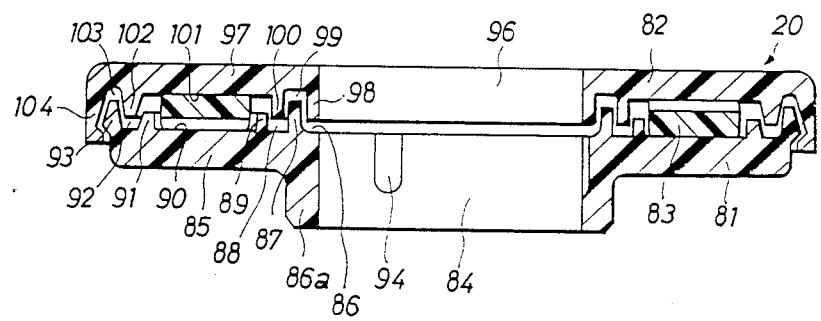
FIG. 35 is a longitudinal cross sectional view of another embodiment of an eighth thrust bearing according to the present invention.

FIG. 35 is a longitudinal cross sectional view illustrating another embodiment of the eighth thrust bearing according to the present invention.

In this embodiment, in addition to the respective constitutions of the eighth thrust bearing according to the present invention, a cylindrical portion 86a is formed integrally with an inner circumferential edge of the lower casing 81, so that an interior space of the cylindrical portion 86a constitutes the penetration aperture 84. Except provision of the cylindrical portion 86a, the construction of this embodiment is same as in the embodiment shown in FIG. 31.

The cylindrical portion 86a facilitates incorporation of the thrust bearing into the flat portion $S_1$ of the upper spring seat S of the thrust assembly.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thrust bearing for use with an automobile thrust-strut type suspension having a strut incorporating a shock absorber, a piston rod inserted in the shock absorber, a mounting member for supporting the piston rod to the automobile body, and an upper spring seat loosely engaging the piston rod, the mounting member and the upper spring seat having opposed, substantially planar surface offset from each other and defining an annular space between them, said bearing being adapted to be received in the annular space between the upper spring seat and the mounting member and adapted to receive the piston rod therethrough, said bearing comprising:

a lower casing made of synthetic resin and having a longitudinal axis, said lower casing including:

a cylindrical portion having a substantially planar upper surface, a lower surface, an outer circumferential surface, and a penetration aperture of circular cross-section coaxial with said longitudinal axis of said lower casing, said penetration aperture being adapted to receive the piston rod of the suspension therein; and a collar portion extending outwardly from and formed integrally with said outer circumferential surface of said cylindrical portion, said collar portion having substantially planar upper and lower surfaces and an outer circumferential surface, said lower surface of said collar portion being adapted to matingly engage the upper surface of the upper spring seat of the suspension, and said collar portion including an annular inner lower lip portion extending upwardly from said upper surface of said collar portion coaxially with said longitudinal axis of said lower casing and formed integrally with said upper surface of said collar portion, said inner lower lip portion having a distal end offset from said upper surface of said collar portion, said collar portion further including an annular protruded portion extending upwardly from said upper surface of said collar portion and formed integrally with said outer circumferential surface of said collar portion, said protruded portion having an outer circumferential surface and an outwardly extending engaging portion formed on said outer circumferential surface of said protruded portion, and said collar portion further including an annular outer lower lip portion extending upwardly from said upper surface of said collar portion coaxial with said longitudinal axis of said lower casing and defining an inner annular groove in cooperation with said inner lower lip portion and an outer annular groove with said protruded portion, said outer lower lip portion having a distal end offset from said upper surface of said collar portion, and said inner annular groove having a bottom surface, said inner lower lip portion having an outer diameter "d1" and said outer lower lip portion having an inner diameter "d2", respectively, "d1" being smaller than "d2";

an upper casing made of synthetic resin and having a longitudinal axis, said upper casing comprising a disk-like portion having substantially planar upper and lower surfaces, an outer circumferential edge, a circular aperture formed at the center thereof coaxial with said longitudinal axis of said upper casing and defining an inner circumferential edge, an annular outer upper lip portion extending downwardly from said lower surface of said disk-like portion coaxial with said longitudinal axis of said upper casing, and an annular suspended portion extending downwardly from said lower surface of said disk-like portion and formed integrally with said outer circumferential edge of said disk-like portion and defining an outer annular groove in cooperation with said outer upper lip portion, said upper casing further including an annular inner upper lip portion extending downwardly from said lower surface of said disk-like portion coaxial with said longitudinal axis of said upper casing and formed integrally with an inner circumferential portion of said disk-like portion and defining an inner annular groove in cooperation with said annular outer upper lip portion, said upper surface of said disk-like portion being adapted to matingly engage the lower surface of the mounting member of the suspension, said circular aperture being adapted to receive the piston rod of the suspension therein, said inner and outer upper annular lip portions each having a distal end offset from said lower surface of said disk-like portion, and said suspended portion having a distal end offset from said lower surface of said disk-like portion and an engaging hook portion formed at said distal end for cooperation with said engaging portion of said protruded portion; and a bearing piece made of synthetic resin and comprising an annular plate having upper and lower surfaces and an inner diameter greater than "d1" and an outer diameter less than "d2", said bearing piece being received in said inner annular groove of said lower casing;

said hook portion of said suspended portion of said upper casing being snap-fitted with said engaging portion of said protruded portion of said lower casing to define a snap-fit portion, whereby said upper casing is fitted rotatably to said lower casing, said upper surface of said bearing piece being slidably abutted against said lower surface of said disk-like portion, said distal ends of said inner and outer upper lip portions being overlapped radially with said distal ends of said inner and outer lower lip portions, respectively, to define inner and outer overlapped portions, said lower surface of said bearing piece being slidably abutted against said bottom surface of said inner annular groove, whereby tight seals are formed at said snap-fit portion and said inner and outer overlapped portions.

2. The bearing as claimed in claim 1, in which said cylindrical portion further has an annular innermost lower lip portion extending upwardly from said upper surface of said cylindrical portion adjacent and offset stepwise from said penetration aperture, said innermost lower lip portion defining a cylindrical aperture having a diameter slightly greater than that of said penetration aperture and defining an innermost annular groove in cooperation with said inner lower lip portion, said innermost lower lip portion having a distal end offset from said upper surface of said cylindrical portion, said distal end of said innermost lower lip portion being overlapped radially with said distal end of said inner upper lip portion, said disk-like portion further has an innermost upper lip portion extending downwardly from said lower surface of said disk-like portion and formed integrally with said inner circumferential edge of said disk-like portion, and defining an innermost annular groove in cooperation with said inner upper lip portion, said innermost upper lip portion having a distal end offset from said lower surface of said disk-like portion, said distal end of said innermost upper lip portion being overlapped radially with said distal end of said innermost lower lip portion.

3. The bearing as claimed in claim 2, in which said lower surface of said collar portion is substantially offset from said lower surface of said cylindrical portion.

4. The bearing as claimed in claim 2, in which said lower surface of said collar portion is substantially coplanar with said lower surface of said cylindrical portion.

* * * * *